(12) United States Patent
Peterson et al.

(10) Patent No.: US 6,517,126 B1
(45) Date of Patent: Feb. 11, 2003

(54) INTERNAL SWAGE FITTING

(75) Inventors: Ivan Harry Peterson, Auburn, NH (US); John Carl Glessner, Kings Mills, OH (US)

(73) Assignee: General Electric Company, Schenectady, NY (US)

( * ) Notice: Subject to any disclaimer, the term of this patent is extended or adjusted under 35 U.S.C. 154(b) by 57 days.

(21) Appl. No.: 09/668,940

(22) Filed: Sep. 22, 2000

(51) Int. Cl.⁷ .......................... F16L 13/14; F16L 19/04
(52) U.S. Cl. .................. 285/382.4; 29/507; 285/382.5; 285/334.4
(58) Field of Search .............. 285/382.4, 382.5, 285/258, 350, 334.4; 29/507

(56) References Cited

U.S. PATENT DOCUMENTS

| 1,507,138 A | | 9/1924 | Pierce | |
|---|---|---|---|---|
| 3,149,860 A | | 9/1964 | Hallesy | |
| 3,653,694 A | * | 4/1972 | Nicol | 285/334.4 |
| 4,805,945 A | * | 2/1989 | Foucault et al. | 285/382.5 |
| 4,844,517 A | | 7/1989 | Beiley et al. | |
| 5,080,406 A | | 1/1992 | Hyatt et al. | |
| 5,340,163 A | * | 8/1994 | Merrer et al. | 285/334.4 |
| 6,108,895 A | * | 8/2000 | Helsley, Jr. | 285/382.7 |

FOREIGN PATENT DOCUMENTS

| DE | 19548185 A1 | 6/1997 |
|---|---|---|
| GB | 1408725 | 10/1975 |

* cited by examiner

Primary Examiner—Lynne H. Browne
Assistant Examiner—Aaron Dunwoody
(74) Attorney, Agent, or Firm—Nathan D. Herkemp; Pierce Atwood

(57) ABSTRACT

An internal swage fitting for swaging a tube. The fitting includes a tube connection region with one or more radial grooves and an expansion cavity at the end adjacent to the end of the tube to be swaged. The expansion cavity accommodates flowing tube material during the swaging process with minimal axial pressure on the fitting. The expansion cavity also includes a stop wall to fix the location of the tube in the fitting. The expansion cavity enables swaging of tube materials of relatively high ductility without accounting for setback. It therefore eliminates the need for a collar to establish setback during swaging.

8 Claims, 3 Drawing Sheets

INTERNAL SWAGE FITTING

BACKGROUND OF THE INVENTION

This invention relates generally to fittings coupled to tubes by swaging and more particularly to internal swage fittings.

A fitting is an auxiliary piece of equipment used to establish a terminus or junction site for a pipe, rod, or tube. In particular, a common use for a fitting is to connect separate tubes together to allow fluid to pass between, preferably without leakage. A fitting is also often used as a closure device to terminate the end of an otherwise open tube. Among many other applications, fittings are used in the aerospace industry to enclose tubes that convey fuel, hydraulic fluids, and the like from one location to another. In those and other critical applications, it is important that the fitting be sufficiently secure about the tube so as to withstand vibration, fluid characteristics and the like without failure.

Fittings are often coupled to tubes by welding. Welding can be a time-consuming, costly method of fitting affixation. Further, the weld may not be sufficient to ensure complete coupling and can cause unacceptable stress intensification factor of the tube. Swaging is an alternative mechanical process to join a fitting to a tube without the limitations associated with welding. There are two types of swaging processes: external swaging and internal swaging. External swaging involves the application of a fitting having external surface variations, such as radial or axial lands and grooves, to a tube. The applied fitting is swaged by forging, hammering, or squeezing, such that the external surface configuration is transferred to the interior of the fitting and thus to the tube. The tube is thereby deflected and contorted in the area where it contacts the fitting such that there is a secure coupling of the two. Unfortunately, the transfer of the fitting's external surface configuration may not be sufficient to establish an adequate coupling, or may cause tube cracking in high cycle fatigue.

Internal swaging addresses, in part, some of the problems associated with external swaging. Internal swaging involves the application of a fitting having internal surface variations, again such as lands and grooves, to a tube. The applied fitting is swaged by placing an expander device within the tube and forcing the tube outwardly onto the interior surface of the fitting, or by squeezing the fitting onto the tube. There is a more direct interface between the fitting's surface configuration and the tube exterior than exists with external swaging. The tube therefore generally conforms more closely to the original surface configuration, resulting in an improved connection between the fitting and the tube.

One type of internal swage fitting found to be suitable for some aerospace applications is described in U.S. Pat. No. 4,844,517 issued to Beiley et al. and assigned to Sierracin Corporation of Burbank, Calif. In one configuration, the Beiley fitting includes three or more radial rectangular grooves of specified width and depth dimensions. The groove closest to the end of the tube is of the same design as the other grooves. In another configuration, a series of ramped grooves are combined with a rectangular "end" groove. The rectangular end groove is substantially the same as the rectangular grooves of the first fitting configuration described. That is, the tube butts against it.

In commercial use, the Beiley fitting is most suitable for the swaging of tubes made of low ductility material, including Titanium. However, materials of relatively higher ductility, such as stainless steels including SS321, Inconel 625, and other similarly ductile materials, are also used in a wide array of tube applications, including aerospace fluid transfer systems. The materials of higher ductility "flow" to a greater extent than the lower ductility materials under equivalent swaging pressure. The swaging process performed on a low-ductility tube causes the tube to be drawn into the fitting and results in a bulging of the tube at the end groove. The flowing material is forced outwardly toward the fitting, placing significant axial load in that localized area. This bulging of the tube material can cause failure of the fitting as well as undesired changes in tube dimensions.

In order to account for the flowing or "sucking in" of the tube into the fitting during the swaging process, it is necessary to set the tube back in relation to the fitting. That is, the tube must be placed in an offset position with respect to the fitting terminus to accommodate the axial and radial flow of the tube material. The swaging process causes the tube to flow and fill into the fitting to make up the setback difference. Since the tube must be completely and securely affixed to the fitting, maintaining the correct setback accurately is important. That is achieved by applying a capture collar about the tube adjacent to the fitting location. The collar must be rigidly but releasably affixed about the tube. Upon completion of the swaging process the collar must be removed. The steps of accurately aligning and applying and removing the collar must be repeated for each fitting applied to each tube of relatively ductile material. Therefore, what is needed is an internal swage fitting that can be used with ductile tubing. What is also needed is such an internal swage fitting that eliminates the need for setback and the use of a setback collar.

SUMMARY OF THE INVENTION

The above-mentioned needs are met by the present invention, which provides an internal swage fitting that accommodates the flow of high-ductility tube materials. The fitting includes a hollow cylindrical body having an internal surface and an external surface, a tube receiving region and a tube connection region. The internal surface of the body in the tube connection region includes one or more grooves and an expansion cavity for receiving excess material of the tube during a swaging process. The fitting also includes a tube stop wall adjacent to the expansion cavity. A termination end of the tube abuts the tube stop wall when the tube is placed within the cylindrical body. The expansion cavity includes an end wall extending from the tube stop wall and away from the one or more grooves at an angle so as to establish a fill space region for flowing tube material to fill in without applying excessive axial pressure on the fitting.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
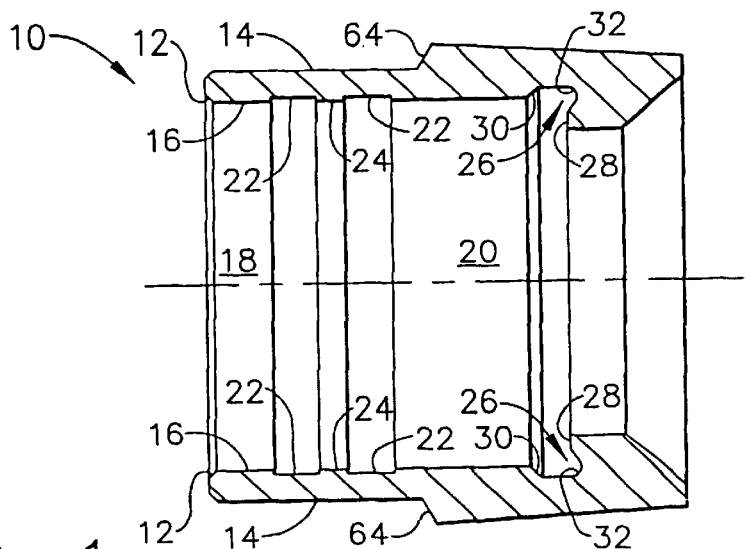
FIG. 1 is a cross-sectional view of a ferrule (female) swage fitting with the internal configuration of the present invention.

Referring to the drawings wherein identical reference numerals denote the same elements, FIG. 1 illustrates a female (or ferrule) internal swage fitting 10 of the present invention. The fitting 10 is fabricated of any material suitable for the particular application. For example, in the swaging of a tube formed of a ductile material such as SS321 stainless steel, Inconel 625, or the like, the fitting 10 may be fabricated of Titanium or A286. Of course, the fitting 10 may be formed of any material sufficient to cause flow of the tube during the swaging process without substantial distortion of the fitting 10.

Figure 3:
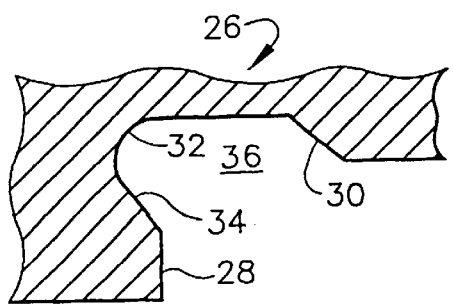
FIG. 3 is a close-up cross-sectional view of the expansion cavity of the internal swage fitting configuration of the present invention.

The ferrule fitting 10 includes a main hollow cylindrical body 12 having an external surface 14 and an internal surface 16. The body 12 has a tube receiving region 18 and a tube connection region 20. The internal surface 16 of the tube connection region 20 of the fitting 10 includes a plurality of radially arranged coupling grooves 22 spaced apart axially by a land 24. As shown in FIGS. 1 and 3, the tube connection region 20 further includes a radially arranged expansion cavity 26 and a tube stop wall 28. The tube stop wall 28 blocks forward progression of a tube-to-be-swaged in the fitting 10. The expansion cavity 26 establishes a location for excess material of the tube to flow during the swaging process.

The expansion cavity 26 includes an entry sidewall 30, a curved fill region 32, and a backwall 34. The fill region 32 extends beyond the stop wall 28 to permit excess tube material to flow therein without creating excess axial stress on the fitting 10 at the tube connection region 20. The backwall 34 is angled away from the stop wall 28 to allow flow material to enter space 36 rather than move directly upward against the internal surface 16 of the fitting 10. The dimensions of the grooves 22, the land 24 and the expansion cavity 28 may be selected as a function of the structural characteristics of the tube 12 and the fitting 10. The angle of the back wall 34 with respect to the tube stop wall 28 may also be selected as a function of the flow characteristics of the tube material and the hoop strength of the fitting 10. The back wall 34 may be angled away from the stop wall 28 at an angle of between about 10° and about 75° and, in one embodiment at an angle of about 45°.

Figure 2:
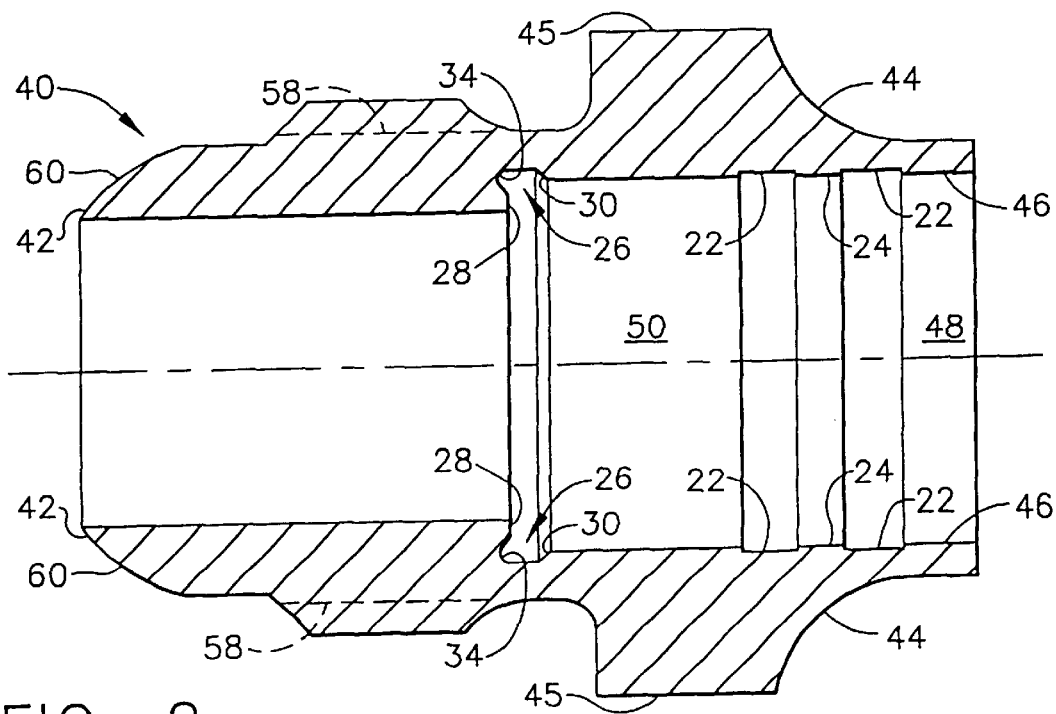
FIG. 2 is a cross-sectional view of a ball nose (male) swage fitting with the internal configuration of the present invention.

FIG. 2 illustrates a corresponding male (or ballnose) internal swage fitting 40. The ballnose fitting 40 includes a main hollow body 42 and an external surface 44 and an internal surface 46. The fitting 40 may be fabricated of a material suitable for swaging a tube of relatively ductile material. For example, the fitting 40 may be fabricated of Titanium or A286.

With continuing reference to FIGS. 2 and 3, the body 42 of the fitting 40 has a tube receiving region 48 and a tube connection region 50. It is to be noted that the housing 42 of the fitting 40 may be of a selectable configuration. However, in order to provide structural reinforcement to the fitting 40 in the tube connection region 50, it includes a structural region 45. The structural region 45 is of greater thickness than the remainder of the wall thicknesses of the body 42 to provide hex flats of the fitting 40 to tighten or loosen the fitting on a tube after the fitting 40 has been swaged to a tube.

The internal surface 46 of the tube connection region 50 of the fitting 40 includes a plurality of radially arranged coupling grooves 22 spaced apart axially by a land 24. The tube connection region 50 further includes a radially arranged expansion cavity 26 and a tube stop wall 28. The tube stop wall 28 blocks forward progression of a tube-to-be-swaged in the fitting 40. The expansion cavity 26 establishes a location for excess material of the tube to flow during the swaging process.

The expansion cavity 26 includes an entry sidewall 30, a curved fill region 32, and a backwall 34. The fill region 32 extends beyond the stop wall 28 to permit excess tube material to flow therein without creating excess axial stress on the fitting 40 at the tube connection region 50. The backwall 34 is angled away from the stop wall 28 to allow flow material to enter space 36 rather than move directly upward against the internal surface 16 of the fitting 40. The dimensions of the grooves 22, the land 24 and the expansion cavity 28 may be selected as a function of the structural characteristics of the tube 12 and the fitting 40. The angle of the back wall 34 with respect to the tube stop wall 28 may also be selected as a function of the flow characteristics of the tube material and the hoop strength of the fitting 40. The back wall 34 may be angled away from the stop wall 28 at an angle of between about 10° and about 75° and, in one embodiment at an angle of about 45°.

Figure 4:
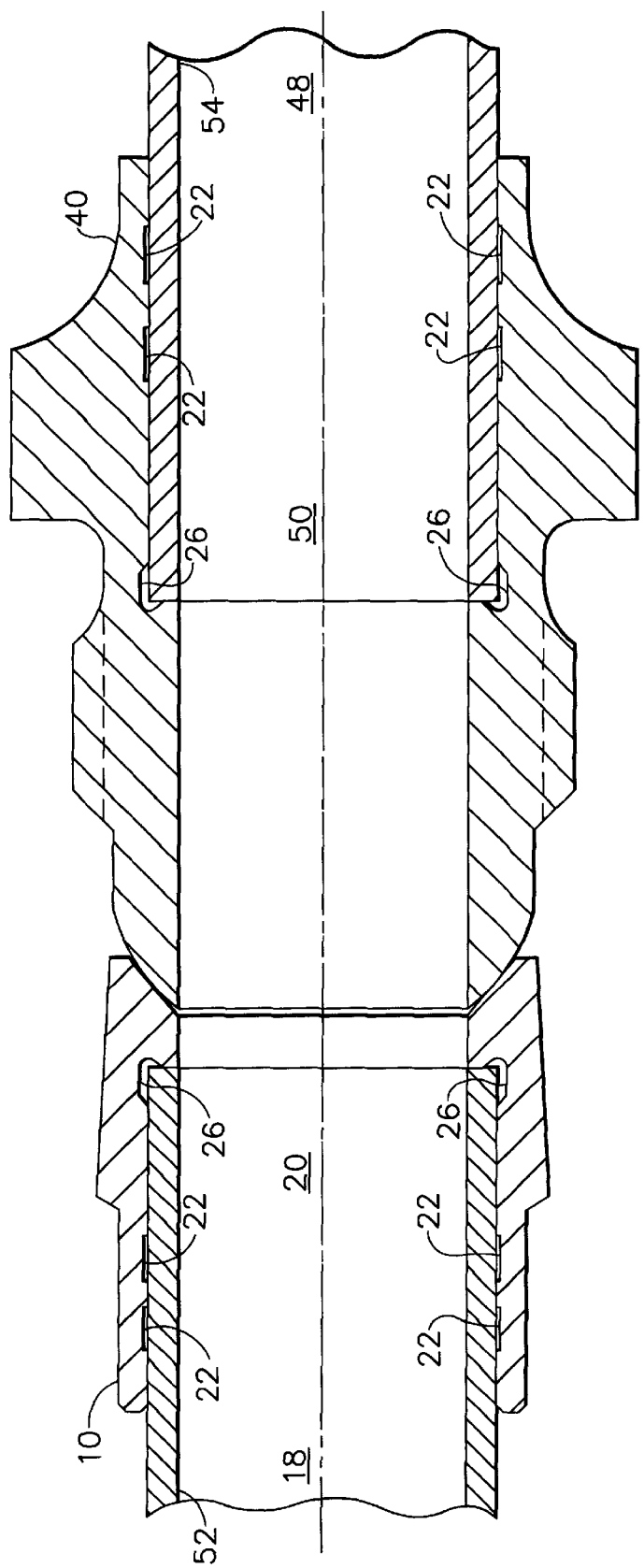
FIG. 4 is a cross-sectional view of the combination of the ferrule and ball nose fittings in assembled relationship with tubes in place prior to swaging.

When two tubes are to be coupled together in a swaging process, the ferrule fitting 10 and the ballnose fitting 40 are arranged in relation to the tubes in a manner shown in FIG. 4. A first tube 52 is inserted into the tube-receiving region 18 of the ferrule fitting 10. It is directed toward the tube stop wall 28 of the fitting 10 until it comes in contact with that surface. A second tube 54 is inserted into the tube-receiving region 48 of the ballnose fitting 40. It is directed toward the tube stop wall 28 of the fitting 40 until it comes in contact with that surface. The fitting 10 is then swaged onto the tube 52 and the fitting 40 swaged onto the tube 54 using conventional swaging methods. The conventional swaging methods may include the use of either a roller swage or a bladder swage and mandrel inserted into the fitting/tube combination and removed upon completion of the swaging process.

Figure 5:
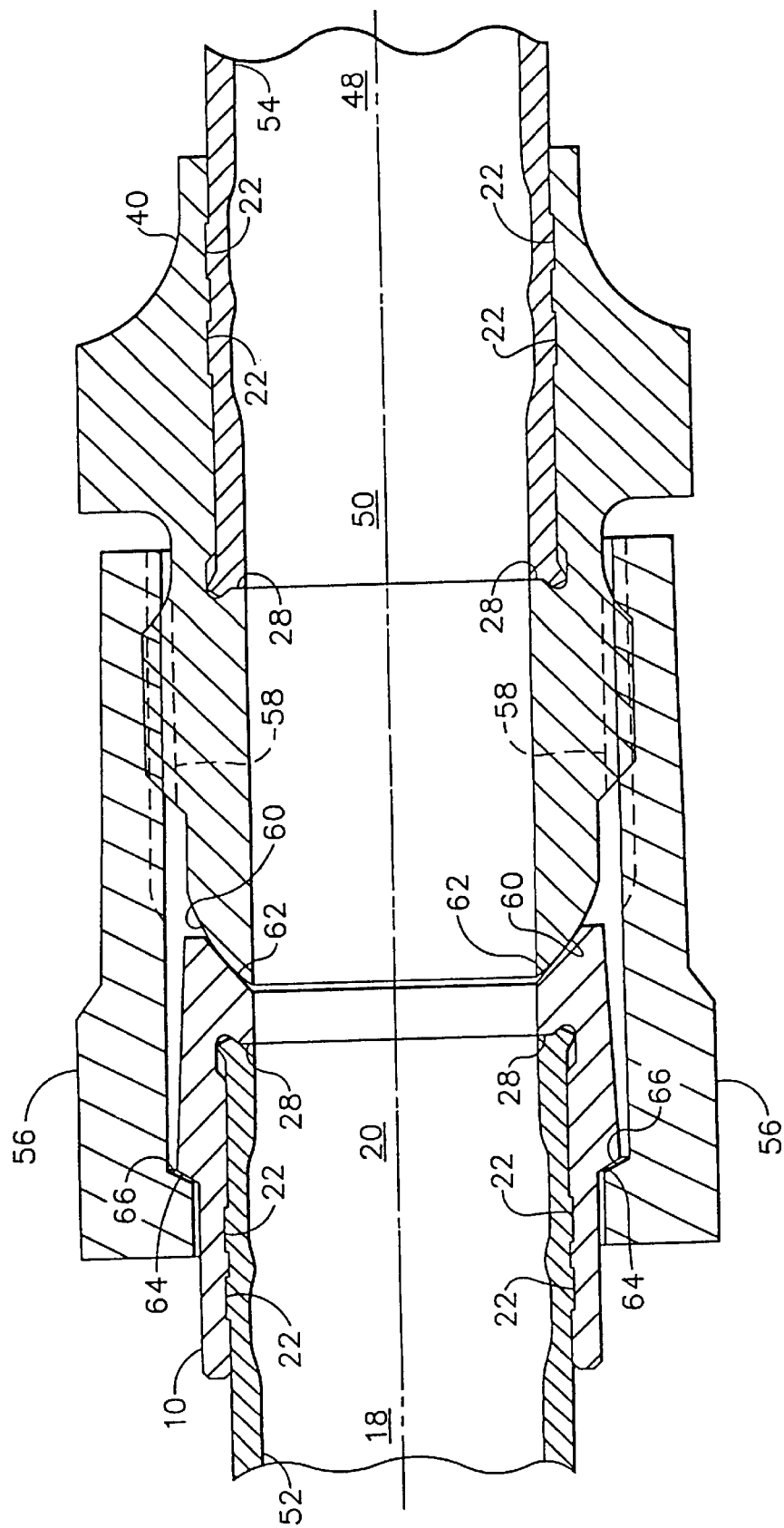
FIG. 5 is a cross-sectional view of the combination of the ferrule and ball nose fittings in assembled relationship with tubes in place subsequent to swaging.

The fittings 10 and 40 are shown in FIG. 4 in adjacent relation to one another prior to swaging. However, the respective tubes and fittings may be swaged apart from one another and then brought into communication with one another prior to final assembly. It can be seen that the wall thicknesses of the tubes 52 and 54 are substantially uniform and straight prior to swaging. The swaging process, as shown in FIG. 5, causes the tubes to distort in the vicinity of the grooves 22 and the expansion cavity 26 and a portion of the tube material to flow into those regions. The design of those regions of the internal fittings 10 and 40 allow the tube material in those regions to flow in a suitable direction without placing excess axial stress on the fittings. In addition, the stop 28 halts further inward movement of the tubes.

FIG. 5 illustrates one embodiment of the joining together of two tubes swaged with the internal swage fittings of the present invention. In particular, a threaded nut 56 is applied to fitting threads 58 of the fitting 40 to Ser. No. 09/668,940

13DV-13662 draw the two fittings together. A ballnose receiving mating surface 62 of the fitting 10 is placed in contact with a ferrule entering mating surface 60 of the fitting 40. The nut 56 is then tightened onto the fitting 40. The fitting 10 is drawn toward the fitting 40 because a ferrule capture wall 64 of the body 12 is grabbed by nut flange 66 as the nut 56 is threaded onto the fitting 40. The threading action fixes the two fittings together. In the embodiment of the present invention shown in FIG. 5, the tubes 52 and 54 are securely coupled together so that fluid may pass between the two. It is to be noted that an alternative embodiment of the ballnose fitting 40 may be used as a termination of the tube 54 without coupling to another tube.

The internal swage fittings shown and described including the expansion cavity 26 enable reliable swaging of tubing of relatively high ductility without placing excessive axial force on those fittings. Further, expansion cavity 26 in combination with the stop wall 28 eliminates sucking in of the tube during the swaging process. Setbacks are no longer required and, therefore, collars and collar application and removal steps are eliminated.

The foregoing has described an improved internal swage fitting. While specific embodiments of the present invention have been described, it will be apparent to those skilled in the art that various modifications thereto can be made without departing from the spirit and scope of the invention as defined in the appended claims.

What is claimed is:

1. An internal swage fitting for swaged attachment to a tube having a termination end, the fitting comprising:
    a hollow cylindrical body having an internal surface and an external surface, a tube receiving region and a tube connection region, said tube connection region including a tube stop wall, wherein the termination end of the tube abuts said tube stop wall when the tube is placed within said hollow cylindrical body wherein said internal surface of said body in said tube connection region includes one or more grooves and an expansion cavity for receiving excess material of the tube during a swaging process, said expansion cavity defining a circumferentially extending volume which is disposed adjacent said tube stop wall and extends both radially outwardly from said internal surface of said body and axially beyond the axial location of said tube stop wall in a direction away from said termination end of said tube.

2. The fitting of claim 1 wherein said expansion cavity includes a back wall extending from said tube stop wall away from said one or more grooves at an angle.

3. The fitting of claim 2 wherein said angle of said back wall with respect to said tube stop wall is between about 10° and about 75°.

4. The fitting of claim 3 wherein said angle of said back wall with respect to said tube stop wall is about 45°.

5. The fitting of claim 2 wherein said expansion cavity includes an entry sidewall and a curved wall between said entry sidewall and said back wall.

6. The fitting of claim 5 wherein said entry sidewall, said curved wall, and said back wall define a curved fill region.

7. The fitting of claim 1 wherein said one or more grooves of said internal surface are radially aligned within said hollow body.

8. An internal swaging fitting combination for coupling together a first tube and a second tube in swaged attachment, wherein each tube includes a termination end, the fitting combination comprising:
    a ferrule fitting having a hollow cylindrical body with an internal surface and an external surface, a tube receiving region for receiving the first tube and a tube connection region, said tube connection region including a tube stop wall, wherein the termination end of the first tube abuts said tube stop wall when the first tube is placed within said hollow cylindrical body, wherein said internal surface of said body in said tube connection region includes one or more grooves and an expansion cavity for receiving excess material of the first tube during a swaging process, said expansion cavity defining a circumferentially extending volume which is disposed adjacent said tube stop wall and extends both radially outwardly from said internal surface of said body and axially beyond the axial location of said tube stop wall in a direction away from said termination end of said first tube, and wherein said external surface includes a ballnose fitting receiving mating surface;
    a ballnose fitting having a hollow cylindrical body with an internal surface and an external surface, a tube receiving region for receiving the second tube and a tube connection region, said tube connection region including a tube stop wall, wherein the termination end of the second tube abuts said tube stop wall when the second tube is placed within said hollow cylindrical body, wherein said internal surface of said body of said ballnose fitting in said tube connection region includes one or more grooves and an expansion cavity for receiving excess material of the second tube during a swaging process, said expansion cavity defining a circumferentially extending volume which is disposed adjacent said tube stop wall and extends both radially outwardly from said internal surface of said body and axially beyond the axial location of said tube stop wall in a direction away from said termination end of said second tube, and wherein said external surface includes a ferrule fitting entry mating surface; and
    a nut for coupling said ferrule fitting and said ballnose fitting together, wherein said nut includes threading for coupling to said external surface of said ballnose fitting.

* * * * *

UNITED STATES PATENT AND TRADEMARK OFFICE
CERTIFICATE OF CORRECTION

PATENT NO.    : 6,517,126 B1
DATED         : February 11, 2003
INVENTOR(S)   : Ivan Harry Peterson et al.

It is certified that error appears in the above-identified patent and that said Letters Patent is hereby corrected as shown below:

Column 4,
Line 67, delete "Ser. No. 09/668,940".

Column 5,
Line 1, delete "13DV-13662".

Signed and Sealed this

Fifteenth Day of June, 2004

JON W. DUDAS
*Acting Director of the United States Patent and Trademark Office*